June 29, 1965 H. KELLER 3,192,465
SQUARE WAVE GENERATOR
Filed Nov. 28, 1962
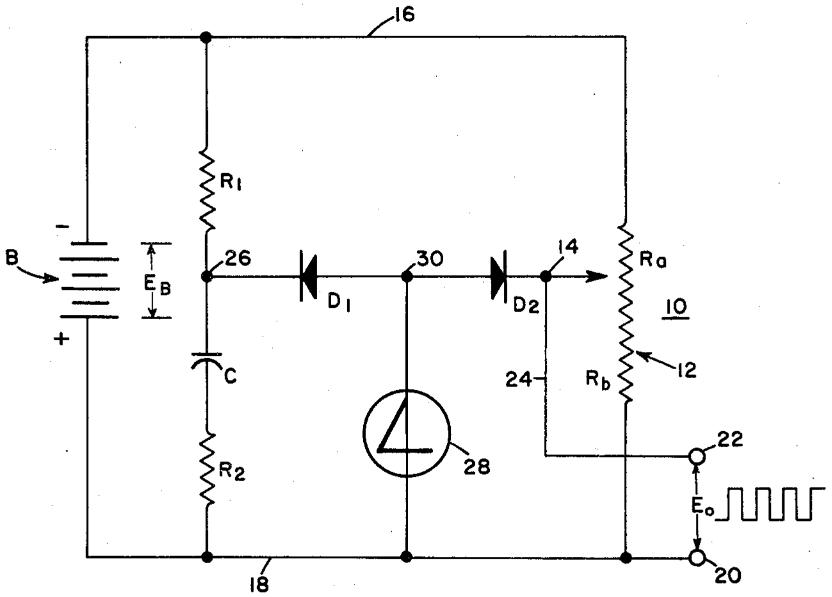
INVENTOR.
HANS KELLER
BY
ATTORNEY

United States Patent Office 3,192,465
Patented June 29, 1965

3,192,465

SQUARE WAVE GENERATOR

Hans Keller, Gundelfingen, Germany, assignor to Clevite Corporation, a corporation of Ohio Filed Nov. 28, 1962, Ser. No. 240,555
Claims priority, application Germany, Dec. 8, 1961, J 20,982
7 Claims. (Cl. 321—44)

This invention relates to square wave generators and, particularly, to circuits for converting an applied steady D.-C. voltage to a pulsating output voltage of rectangular wave form.

A wide variety of circuits are known for converting steady D.-C. voltages to square wave A.-C. or pulsating D.-C. Perhaps the best known for these purposes are the so-called multivibrator circuits which usually employ a pair of active elements, e.g., electron tubes or transistors.

Some circuits for converting steady D.-C. to A.-C. or pulsating D.-C. employ a single active element but these then require coils and capacitors to produce oscillation. The need for inductive components is highly undesirable because they inherently tend to be more space-consuming and expensive than other common circuit components and usually must be custom-designed for particular applications.

It is, therefore, the primary object of the present invention to provide square wave generator circuits which include only one active element yet do not employ inductive circuit components, i.e., coils.

Another object is the provision of square wave generator circuits which tend to be less costly and more compact than comparable prior art circuits.

These and further objects are fulfilled by square wave generator circuits which, in accordance with the present invention, comprise a voltage divider network and a four-layer diode. The output voltage is developed across one branch of the voltage divider which branch is connected in parallel with the four-layer diode. A capacitor is provided in circuit with the four-layer diode and charged from a D.-C. source to the breakdown voltage of the four-layer diode whereupon the latter becomes conductive, substantially short-circuiting the branch of the voltage divider across which the output voltage is developed.

Additional objects of the invention, its advantages, scope, and the manner in which it may be practiced will be more fully evident to persons conversant with the art from the following description of an exemplary embodiment thereof taken in conjunction with the sub-joined claims and the annexed drawing in which the single figure is a schematic circuit diagram of a square wave generator as contemplated by the present invention.

Referring, then, to the drawing, a voltage divider network 10 is provided which, as illustrated, comprises a resistive impedance 12 and an adjustable tap 14 constituting the voltage division point. Tap 14 effectively divides impedance 12 into two resistance branches $R_a$ and $R_b$, all in a well-known manner. It will be appreciated that tap 14 can be eliminated and replaced by a fixed connection point between resistance branches $R_a$ and $R_b$.

The ends of voltage divider network 10 are connected via conductors 16 and 18 to respective input terminals for a steady D.-C. voltage represented by battery B. In the illustrated embodiment, conductor 16 connects the upper end of resistive impedance 12 to the negative terminal of battery B and conductor 18 connects the lower end to the positive terminal.

Conductor 18 also provides a return path or reference potential which is common to one input terminal and one output terminal, 20. The other output terminal, 22, is connected via conductor 24 to voltage divider tap 14. Thus, the output voltage $E_o$ is developed, and equal to the voltage drop, across resistance $R_b$, in the absence of a parallel current path.

Connected back-to-back, i.e., in series with opposing polarities, are a pair of asymmetrical resistance devices or rectifiers $D_1$ and $D_2$, preferably semiconductor diodes. Rectifiers $D_1$ and $D_2$ are connected in series with a load resistance $R_1$ between tap 14 and one terminal of the voltage source B. Specifically, in the illustrated embodiment, rectifiers $D_1$ and $D_2$ have their anodes interconnected; the cathode of $D_2$ is connected to tap 14; and the cathode of $D_1$ is connected through $R_1$ to the negative terminal of battery B.

A current limiting resistance $R_2$ has one end connected to the reference potential conductor 18 and the other end coupled by a capacitor C to a point 26 common to $R_1$ and the cathode of $D_1$.

A four-layer diode 28 connects a point 30 between (common to the anodes of) rectifiers $D_1$, $D_2$ to the reference potential, conductor 18.

At this juncture it is pointed out that the values of $R_a$ and $R_b$ should be such that the D.-C. voltage of tap 14 with respect to the reference potential is at all times less than the breakdown voltage of four-layer diode 28. Resistance $R_2$ limits the current through the four-layer diode.

In operation, capacitor C is charged from battery B through resistances $R_1$ and $R_2$ until its voltage reaches the breakdown value of four-layer diode 28. Thereupon, diode 28 becomes conductive and remains so until the current flowing through it falls below a cut-off value. Capacitor C discharges through diode 28 and $R_2$ until the current falls below that required to maintain the conductivity of the four-layer diode. At this point the four-layer diode cuts off, the capacitor starts re-charging and the cycle is repeated.

During periods when the four-layer diode is not conductive, the output voltage is effectively equal to the potential drop across $R_b$ and is determined by the ratio $R_a/R_b$. This voltage is maintained constant during charging of capacitor C by the blocking action of rectifiers $D_1$, $D_2$.

When four-layer diode 28 goes conductive, it shunts $R_b$, the potential at tap 14 dropping almost instantaneously to a very low value. Under these conditions the output voltage $E_o$ appearing at terminals 20, 22 is determined by the voltage drop through four-layer diode 28 and rectifier $D_2$, both in their low-impedance condition.

The frequency and amplitude of the output voltage can be set by adjustment of the values $R_1$, $R_2$, $R_a$ and/or $R_b$.

Thus, the circuit described is in accordance with and accomplishes the objects of the invention. The generator can be used for control or measurement of high voltages where high output power is not required.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A square wave generator comprising: a voltage divider network having first and second ends adapted for connection to respective terminals of a D.-C. voltage source and having an intermediate tap constituting the voltage division point; a pair of asymmetrical resistance devices connected in series with oppositely directed polarities, one terminal of one of said devices being connected to said voltage-divider tap; resistive impedance means connecting the other terminal of the other of said asymmetrical resistance devices to the first end of said voltage divider network; means including a capacitor coupling said other terminal of said other asymmetrical resistance device to the second end of said voltage divider network; and a four-layer diode having one terminal connected between said asymmetrical resistance devices and its other terminal connected to said second end of the voltage divider network.

2. A square wave generator according to claim 1 wherein the polarity of said asymmetrical resistance devices permits current flow therethrough when said four-layer diode is conductive.

3. A square wave generator according to claim 2 wherein the resistance of said voltage divider network is proportioned so as to limit D.-C. voltage between said tap and second end thereof to a value lower than the breakdown voltage of the four-layer diode.

4. A square wave generator according to claim 3 wherein said means including a capacitor further includes a current limiting resistance connected in series with said capacitor between it and the second end of said voltage divider network.

5. A square wave generator comprising: a pair of input terminals for D.-C. voltage; a pair of output terminals one of which is at a common potential with one of said input terminals; a voltage divider including series resistance means connected between said input terminals and a voltage division point tap constituting the other of said output terminals; a first resistive impedance means having one end connected to the other of said input terminals; a second resistive impedance means having one terminal connected to a point at said common potential; a capacitor connected between the respective other terminals of said resistive impedance means; a pair of rectifiers, connected back-to-back, coupling, said voltage divider tap to a point between said capacitor and first resistive impedance means; and a four-layer diode connecting a point between said rectifiers to a point at said common potential, said series resistance means being proportioned so that the voltage at said tap with respect to said common potential is less than the breakdown voltage of said four-layer diode.

6. A square wave generator comprising: a pair of input terminals for D.-C. voltage; resistive impedance means having an intermediate tap and defining a D.-C. voltage-dividing current path between said input terminals, the voltage-division point of said path constituting one output terminal, the other output terminal being a point of common potential with one of said input terminals; a resistor having one terminal connected to a point of common potential with the other of said input terminals; a pair of rectifiers connected back-to-back between the other terminal of said resistor and said voltage-division point; an additional resistor having one terminal connected to a point of common potential with said one input terminal; a capacitor coupling the other terminal of said additional resistor to the other terminal of the first said resistor; and a four-layer diode connecting a point between said rectifiers to a point of common potential with said one input terminal, the breakdown voltage of said four-layer diode being greater than the voltage at said voltage division point with respect to the potential of said one input terminal.

7. A square wave generator comprising: a voltage divider having resistance branches in series; means for applying a D.C. voltage across said branches; output terminal means for deriving an output voltage across one of said branches; a four layer diode connected in parallel with said one branch; a capacitor and a series resistance connected in parallel with said voltage divider branches for cyclically rendering said four layer diode conductive and non-conductive, said capacitor and a portion of said series resistance being connected in parallel with said one voltage divider branch and the remainder of said series resistance being connected in parallel with the other of said voltage divider branches; and a pair of rectifier elements having terminals of corresponding polarity interconnected to one terminal of said four layer diode and terminals of the opposite polarity connected, respectively, to a point common to the branches of said voltage divider and to a point between said capacitor and said remainder of said series resistance.

References Cited by the Examiner

UNITED STATES PATENTS

| | | | |
|---|---|---|---|
| 3,047,819 | 7/62 | Haas | 331—107 |
| 3,058,009 | 10/62 | Schockley | 307—88.5 |
| 3,123,723 | 3/64 | Wieder | 331—107 |

LLOYD McCOLLUM, *Primary Examiner.*